F. H. CLEMENT.
CUT-OFF GAGE FOR SAWING MACHINES.
APPLICATION FILED NOV. 1, 1913.

1,113,152. Patented Oct. 6, 1914.

WITNESSES:
M. E. Catlin
A. C. Burrel

INVENTOR
F. H. Clement
BY Chas. M. Catlin
ATTORNEY

UNITED STATES PATENT OFFICE.

FRANK H. CLEMENT, OF ROCHESTER, NEW YORK, ASSIGNOR TO AMERICAN WOOD WORKING MACHINERY CO., OF ROCHESTER, NEW YORK, A CORPORATION OF PENNSYLVANIA.

CUT-OFF GAGE FOR SAWING-MACHINES.

1,113,152.     Specification of Letters Patent.     Patented Oct. 6, 1914.

Application filed November 1, 1913. Serial No. 798,664.

*To all whom it may concern:*

Be it known that I, FRANK H. CLEMENT, a citizen of the United States, and a resident of the city of Rochester, State of New York, have invented a new and useful Improvement in Cut-Off Gages for Sawing-Machines, of which the following is a specification, reference being had to the accompanying drawings, in which—

Figure 1:
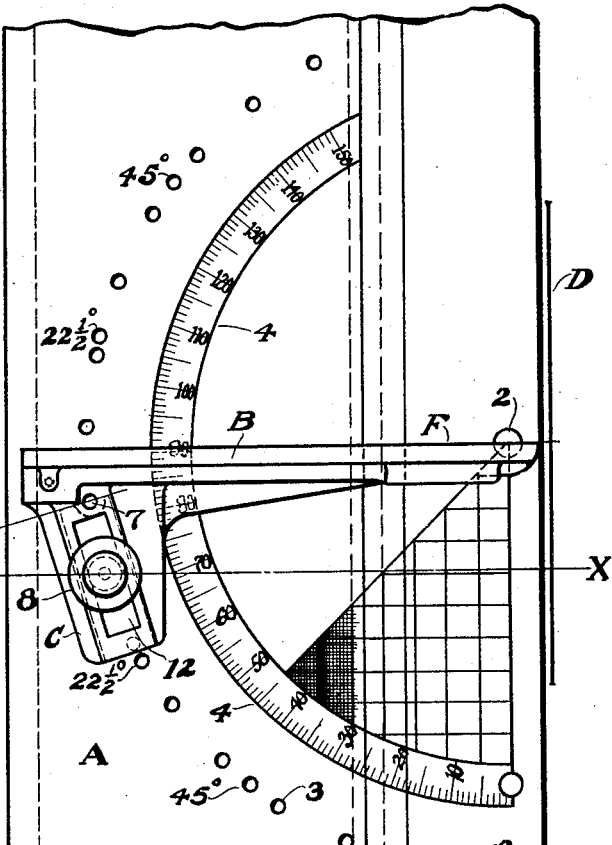
Figure 4:
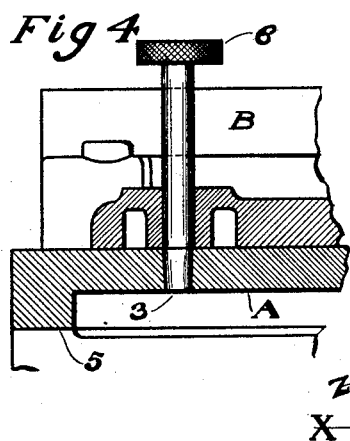
Figure 5:
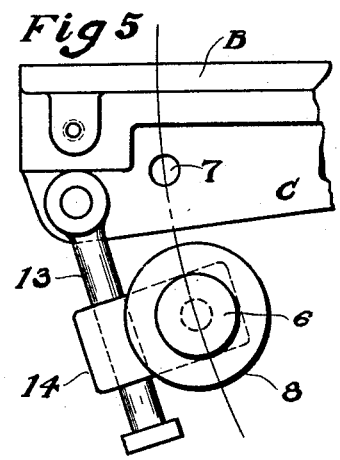
Figure 2:
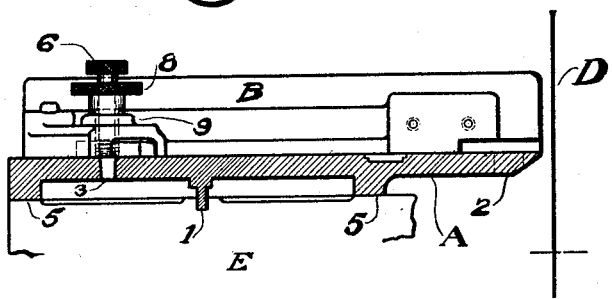
Figure 3:
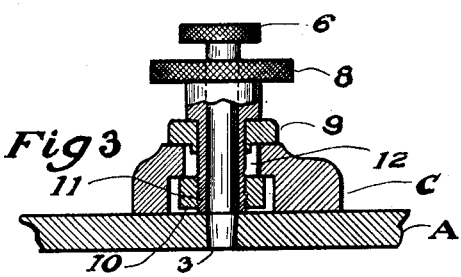

Figure 1 is a plan view of a sawing machine table, having my device attached: Fig. 2 is a sectional elevation at the line "X X" Fig. 1: Fig. 3 is a central cross section of the clamping device. Fig. 4 is a section of a portion of the gage where a stop pin passes through. Fig. 5 shows an equivalent construction.

My invention relates to that class of cut-off gages which is used in connection with a movable table arranged to slide parallel with the saw either on ways or friction rollers, and it consists principally in the application of a stop pin to an angularly adjustable cut-off gage in connection with a sliding block and clamp wheel for setting the fence of the gage at any required angle.

A, Figs. 1 and 2, is a movable table having a suitable guiding tongue 1, sliding freely in a slot in the supporting bed E and having bearings on the latter at 5, 5.

B is a cutting off gage mounted on table A, by means of the pivot pin 2, the center of which is in exact alinement with the working face F of the gage and of the graduated scale 4, and which exactly fits a corresponding hole in the table.

C is a projecting portion of the gage B which helps to support it on the table.

The part G, shown in Fig. 1, is attached to or forms a part of a plate Z, which plate is secured to gage B.

6 is a stop pin fitted accurately to a hole 7 in the gage and having a tapering lower portion which fits into corresponding holes 3 in the table; these holes are arranged in a segment of a circle having the pivot 2 as a center. The scale 4 is a graduated arc on the surface of the table indicating degrees.

D is the saw hung on a suitable arbor so located that the plane of revolution of the saw is parallel with the guiding tongue 1, Fig. 2.

The above description covers a common construction of saw table and gage, my device being an improvement thereon.

The wing C of the gage B has a slot 12 to receive a clamping device consisting of a clamping wheel 8, binding washer 9 and a nut 10, Fig. 3. Wheel 8 has a long stem 11 which passes through the washer 9 and is threaded at the lower end to fit into the nut 10, and is bored through the center to receive the stop pin 6, which is the same pin indicated in Fig. 4, there used to locate the gage at various angles by means of the holes 3. Nut 10, rests against a shoulder in the slot 12, and thus when the screw 11 is turned by wheel 8, the gage is clamped tightly between washer 9 and said nut. The tapering holes 3 in the table are preferably ten degrees apart, called herein principal angles, and the slot 12 is of such a length that the nut 10 and washer 9 may have a movement a trifle greater than the portion of the arc indicated by the spacing of the holes 3. The arc upon which holes 3 are located is struck from the exact center of the pivot 2, and the stop-pin hole 7, and the bore of the clamping wheel 8, lie in the same arc, and therefore only one line of holes 3 is required in the table for any angle whether principal or intermediate.

I have shown in Fig. 5 an equivalent construction to the slot 12 and stop block 8, 9, 10 in which a link 13 is pivoted to the gage body and is fitted to be clamped in the stop block 14. The clamping wheel 8 and the centrally located stop pin 6 are used in a similar manner and the results are the same as with the other construction.

It will be seen that by transposing the pin 6 from hole 7 in the body of the gage to the bore of the wheel 8, the gage body is left free to be adjusted radially about the pivot 2 as far as the slot 12 will permit (which is more than ten degrees), and consequently all angles between the spacings of ten degrees may be reached by adjusting the gage thus liberated, and clamping it at the desired point by means of the wheel 8.

In addition to the regular spacing of the holes 3, it is desirable to place a hole at 45 degrees and one at 22½ degrees in both directions from the 90 degree line; thus all the principal angles are represented by holes 3, and the pin 6 can be instantaneously set at the required principal angle.

The slot 12 is shown as tangential to the arc of adjustment, for simplicity in construction of the parts; but it may be made to conform to that arc if preferred, the result being the same in either case. Furthermore, the slot as shown is a convenient form of attachment of the clamping block to the gage body; as a matter of fact other forms of attachment might be substituted, such as a curved slide way with a clamping block fitted thereto, or the construction shown in Fig. 5. For various reasons the form shown in the drawings is preferred and when so made the binding washer 9 and nut 10 must have sufficient lateral freedom in the slot to allow for the variation between a curved slot and the tangential one shown. The construction shown in Fig. 5 permits the stop block to be brought to the line of the arc readily.

Having thus described my invention, what I claim and desire to secure by Letters Patent is:

1. In a cut-off gage, a gage body pivoted to a movable table, an independent stop block adjustable over said table, means for adjustably connecting the stop block to the gage, selective means in the table, and corresponding selective means in the gage body and in the stop block, whereby certain principal angles may be selected instantaneously, and intermediate angles obtained by the separate adjustment in the independent stop block.

2. In a cut-off gage, a gage body pivoted to a movable table, a slot in said body substantially concentric to the pivot, a clamping block movable in said slot, selective means in the table and corresponding means in the gage body and in the clamping block, whereby either principal or intermediate angles can be obtained on the gage fence.

3. In a cut-off gage, a gage body pivoted to a movable table, an independent stop block movable upon said table and adjustably connected to the gage body, a stop pin hole in the gage body and a corresponding hole in the stop block, selective holes in the table and an interchangeable stop pin fitting both the gage body and the stop block, all operating substantially as described.

4. In a cut-off gage, a gage body pivoted to a movable table, a slot in said body substantially concentric to the pivot, a stop-pin hole in said body, a clamping block movable in said slot and provided with a similar stop-pin hole, and selective holes in said table arranged concentrically to the gage pivot, all operating substantially as described.

5. In a cut-off gage, a gage body pivoted to a movable table, a slot in said body substantially concentric to the pivot, a clamping block movable in said slot, a central clamping screw in the block, a stop-pin hole in the center of the screw, and a corresponding stop-pin hole in the gage permitting the interchange of the stop pin.

6. A pivoted gage body having a slot substantially concentric with the pivot, a clamping block in said slot consisting of a clamping screw and wheel, a binding washer, a nut moving in a recess in said slot, a stop-pin hole in said clamping block and selective holes in the table to receive the stop pin.

FRANK H. CLEMENT.

Witnesses:
A. C. HETHERLIN,
G. M. SCHOLAND.

---

Copies of this patent may be obtained for five cents each, by addressing the "Commissioner of Patents, Washington, D. C."